(12) United States Patent
Noro

(10) Patent No.: US 11,732,784 B2
(45) Date of Patent: Aug. 22, 2023

(54) TENSIONER LEVER

(71) Applicant: TSUBAKIMOTO CHAIN CO., Osaka (JP)

(72) Inventor: Kazushi Noro, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/881,824

(22) Filed: Aug. 5, 2022

(65) Prior Publication Data

US 2023/0049971 A1    Feb. 16, 2023

(30) Foreign Application Priority Data

Aug. 16, 2021 (JP) ................................ 2021-132384

(51) Int. Cl.
| | | |
|---|---|---|
| *F16H 7/08* | (2006.01) | |
| *F16H 7/06* | (2006.01) | |
| *F16H 7/18* | (2006.01) | |

(52) U.S. Cl.
CPC ................. *F16H 7/08* (2013.01); *F16H 7/06* (2013.01); *F16H 2007/081* (2013.01); *F16H 2007/0872* (2013.01); *F16H 2007/0893* (2013.01); *F16H 2007/185* (2013.01)

(58) Field of Classification Search
CPC ..... F16H 7/00; F16H 7/06; F16H 7/08; F16H 2007/0802; F16H 2007/081; F16H 2007/0863; F16H 2007/0872; F16H 2007/0893; F16H 7/18; F16H 2007/185; F16H 2007/0804; F16H 7/0829; F16H 7/0838; F16H 2007/0848
See application file for complete search history.

(56) References Cited

U.S. PATENT DOCUMENTS

| | | | | |
|---|---|---|---|---|
| 3,148,555 A | * | 9/1964 | Peras ........................ | F16H 7/08 474/111 |
| 3,198,025 A | * | 8/1965 | Peras ........................ | F16H 7/08 474/111 |

(Continued)

FOREIGN PATENT DOCUMENTS

| | | | | | |
|---|---|---|---|---|---|
| CN | 109667897 A | * | 4/2019 | ............... | F16H 7/08 |
| CN | 109667898 A | * | 4/2019 | ............... | F16H 7/08 |

(Continued)

*Primary Examiner* — Michael R Mansen
*Assistant Examiner* — Raveen J Dias
(74) *Attorney, Agent, or Firm* — WHDA, LLP

(57) ABSTRACT

To provide a simple-structured tensioner lever capable of consistently exerting a correct reaction force to various fluctuations of tension accompanying varying chain behaviors, whereby vibration and noise when the chain runs can be reduced. The tensioner lever of the present invention includes a lever body having a shoe surface that slidably guides a chain; a first pressing spring configured to have a first pressing arm extending from one end of a first helical part, with a distal end portion contacting the lever body to form a first loading point, and a first support arm extending from the other end of the first helical part, with a distal end portion contacting and being supported by a first support part provided to an attachment surface to form a first support point; and a second pressing spring supported on the lever body at a different position from that of the first pressing spring.

5 Claims, 3 Drawing Sheets

(56) References Cited

U.S. PATENT DOCUMENTS

| | | | |
|---|---|---|---|
| 3,673,884 A * | 7/1972 | Southiere | B62D 55/07 474/111 |
| 4,976,659 A * | 12/1990 | Hans | F16H 7/0834 474/111 |
| 5,462,493 A * | 10/1995 | Simpson | F16H 7/08 474/140 |
| 6,428,435 B1 | 8/2002 | Kumakura et al. | |
| 6,835,149 B2 * | 12/2004 | Konno | F16H 7/08 474/111 |
| 7,540,817 B2 * | 6/2009 | Hashimoto | F16H 7/0848 192/81 C |
| 8,083,623 B2 * | 12/2011 | Cantatore | F16H 7/18 474/111 |
| 8,092,327 B2 * | 1/2012 | Kobara | F02B 67/06 474/111 |
| 9,772,008 B2 * | 9/2017 | Noro | F16H 7/08 |
| 10,408,312 B2 * | 9/2019 | Noro | F16H 7/08 |
| 11,371,591 B2 * | 6/2022 | Muratsubaki | F16H 7/06 |
| 11,434,980 B2 * | 9/2022 | Watanabe | F16H 7/18 |
| 2002/0069539 A1 * | 6/2002 | Tada | F16H 7/18 30/383 |
| 2003/0144101 A1 * | 7/2003 | Konno | F16H 7/08 474/140 |
| 2009/0105022 A1 * | 4/2009 | Cantatore | F16H 7/08 474/111 |
| 2009/0111629 A1 | 4/2009 | Kobara et al. | |
| 2016/0252166 A1 * | 9/2016 | Noro | F16H 7/08 474/111 |
| 2017/0184183 A1 * | 6/2017 | Noro | F16H 7/08 |
| 2021/0131531 A1 * | 5/2021 | Muratsubaki | F16H 7/06 |
| 2021/0156456 A1 * | 5/2021 | Watanabe | F16H 7/08 |
| 2021/0262552 A1 * | 8/2021 | Seki | F16H 7/08 |
| 2021/0356022 A1 * | 11/2021 | Muratsubaki | F16H 7/08 |

FOREIGN PATENT DOCUMENTS

| | | | | |
|---|---|---|---|---|
| EP | 2239483 A2 * | 10/2010 | | F16H 7/0831 |
| JP | H06193693 A * | 7/1994 | | F16H 2007/0806 |
| JP | 2000-274501 A | 10/2000 | | |
| JP | 2009-108909 A | 5/2009 | | |
| JP | 2012-36996 A | 2/2012 | | |
| WO | WO-2010049201 A1 * | 5/2010 | | F16H 7/0834 |
| WO | WO-2014044421 A1 * | 3/2014 | | F16H 7/08 |
| WO | WO-2015115381 A1 * | 8/2015 | | F02B 67/06 |
| WO | WO-2015180517 A1 * | 12/2015 | | F02B 67/06 |
| WO | WO-2019061464 A1 * | 4/2019 | | F16H 7/08 |
| WO | WO-2022028639 A1 * | 2/2022 | | F16H 7/08 |

* cited by examiner

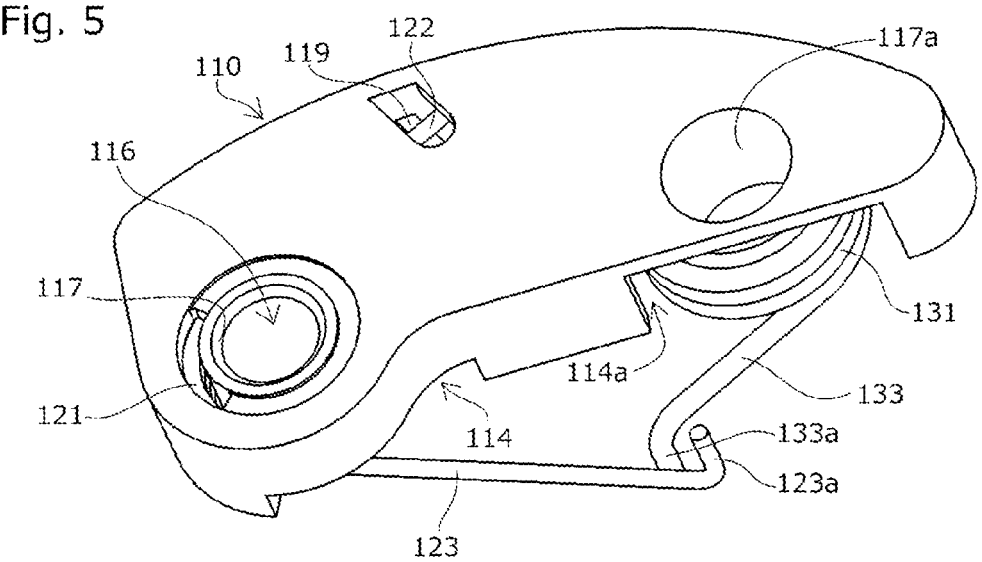

TENSIONER LEVER

BACKGROUND OF THE INVENTION

1. Field of the Invention

The present invention relates to a tensioner lever that slidably guides a running chain, and more particularly to a chain tensioner lever that slidably guides a chain by pressing a shoe surface of a lever body against the chain using a pressing mechanism.

2. Description of the Related Art

Tensioner levers have been used in chain transmissions for an auxiliary machine or the like of a car engine to remove slackness in chains and to prevent vibration of running chains. One such known tensioner lever, which is pivotably attached to an attachment surface of an engine block or the like, includes a lever body having a shoe surface that slidably guides the chain, and a pressing mechanism interposed between the lever body and the attachment surface to press the shoe surface toward the chain using a torsion coil spring (see, for example, Japanese Patent Application Publications Nos. 2000-274501, 2009-108909, and 2012-36996).

These tensioner levers are attached to an attachment surface such that a helical part of the torsion coil spring is loosely fitted around an outer circumferential surface of a boss part protruding from a base part of the lever body toward the attachment surface. A pressing arm extending from one end of the helical part is in contact with the lever body, while a support arm extending from the other end of the helical part has a distal end portion inserted in a spring retention hole formed in the attachment surface.

The torsion coil spring in these tensioner levers is twisted by a load received from the chain and generates a reaction force in accordance with the twisted amount (angular change of the pressing arm).

SUMMARY OF THE INVENTION

The maximum tolerable load of the torsion coil spring in conventional tensioner levers is limited because the distal end portion of the support arm is fixed and the load from the chain is received by the distal end of the pressing arm. Another issue is that when subjected to an excessive load, the torsion coil spring undergoes a large resilient deformation, which compromises the responsiveness to sudden changes in the chain behavior. When the chain moves about largely at the start of the engine, or when the chain undergoes resonance in a high frequency range, the reaction force could not be exerted correctly because of which it was difficult to suppress variation in the chain behavior.

The present invention solves this problem and it is an object of the invention to provide a simple-structured tensioner lever capable of consistently exerting a correct reaction force to various fluctuations of tension accompanying varying chain behaviors, whereby vibration and noise when the chain runs can be reduced.

The present invention solves the above problem by providing a tensioner lever including: a lever body having a shoe surface that slidably guides a chain and rotatably supported on a pivot shaft standing on an attachment surface; and a pressing mechanism interposed between the lever body and the attachment surface to press the shoe surface toward the chain, the pressing mechanism including a first pressing spring and a second pressing spring, the first pressing spring including a first helical part loosely fitted to a cylindrical boss part provided to the lever body, a first pressing arm extending from one end of the first helical part and having a distal end portion contacting the lever body to form a first loading point, and a first support arm extending from the other end of the first helical part and having a distal end portion contacting and being supported by a first support part provided to the attachment surface to form a first support point, the second pressing spring being supported on the lever body at a different position from that of the first pressing spring.

The tensioner lever set forth in claim 1 uses two pressing springs having different characteristics of generating a pressing force, so that it is capable of consistently exerting a correct reaction force to various fluctuations of tension accompanying varying chain behaviors. The second pressing spring is supported on the lever body at a different position from that of the first pressing spring so that the structure is simple, and assembling and maintenance work can be performed easily.

According to the configuration set forth in claim 2, at least one of the first pressing spring and the second pressing spring is configured to generate an effective pressing force when the lever body receives more than a predetermined load from the chain and pivots more than a predetermined angle. Thus responsiveness to load changes is improved by using only one pressing spring in normal situations, while the maximum load can be increased by using both pressing springs for receiving an excessive load.

According to the configuration set forth in claim 3, the second pressing spring has the same structure as that of the first pressing spring, which makes the structure even simpler and facilitates assembling and maintenance work.

According to the configuration set forth in claim 4, the first pressing spring and the second pressing spring can be set in a compact manner.

According to the configuration set forth in claim 5, responsiveness to changes in the chain behavior can be improved even more.

BRIEF DESCRIPTION OF THE DRAWINGS

FIG. 5 is a perspective view on the front side illustrating the configuration of the tensioner lever.

DESCRIPTION OF THE PREFERRED EMBODIMENTS

A tensioner lever that is one embodiment of the present invention is described below with reference to the drawings.

Figure 1:
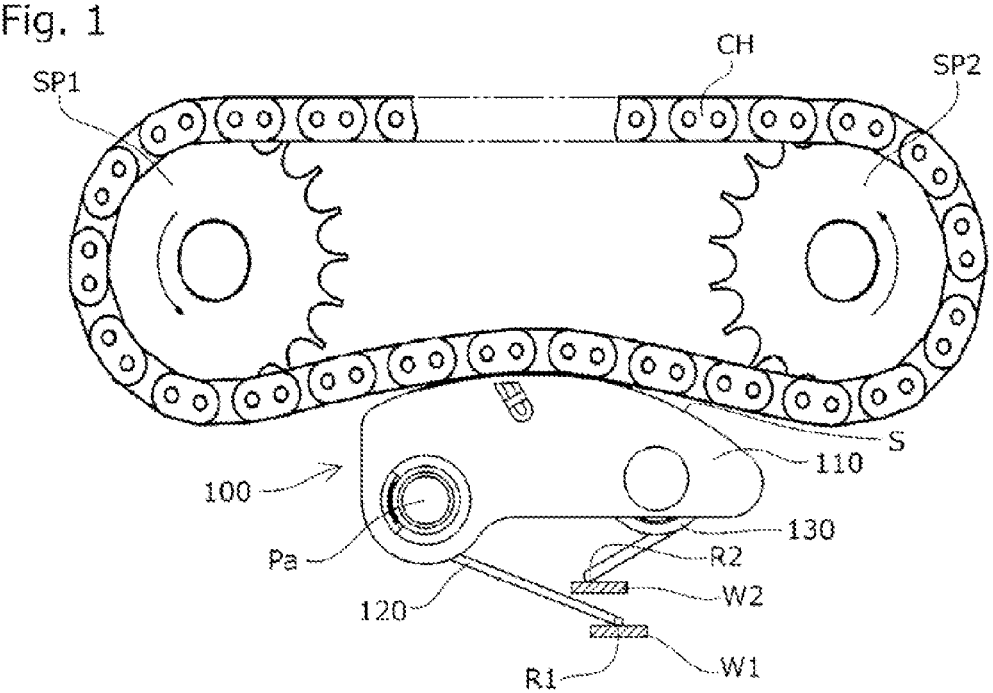
FIG. 1 is a diagram illustrating one example of a manner of use of a tensioner lever that is one embodiment of the present invention.

The tensioner lever 100, as illustrated in FIG. 1, is pivotably mounted on a pivot shaft Pa protruding from an attachment surface (not shown) of an engine block (not shown) or the like to slidably guide a chain CH running between a drive-side sprocket SP1 attached to a crankshaft and a driven-side sprocket SP2 attached to a shaft of an auxiliary machine to keep a correct chain tension.

The tensioner lever 100 includes a lever body 110 made of synthetic resin or the like, and a first pressing spring 120 made of metal or the like and interposed between the lever body 110 and the attachment surface.

Figure 2:
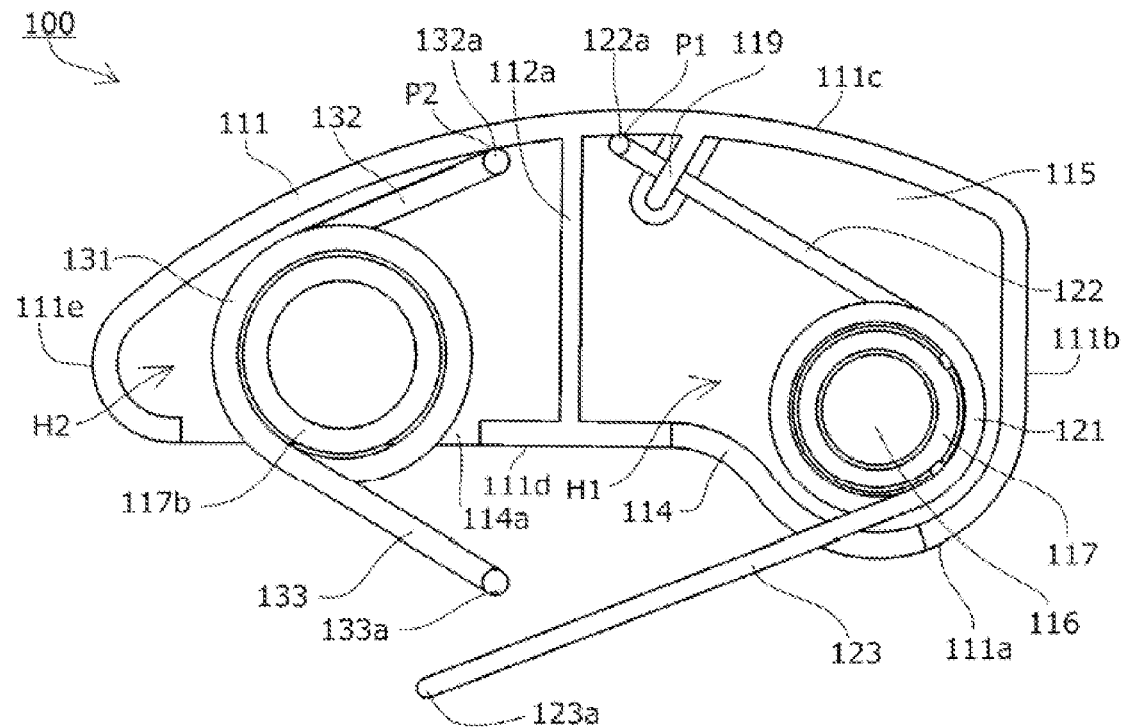
FIG. 2 is a side view on the back side illustrating the configuration of the tensioner lever.

The lever body 110 has a lever circumferential wall 111 formed substantially in a comma-like shape in side view, as illustrated in FIG. 2.

Figure 3:
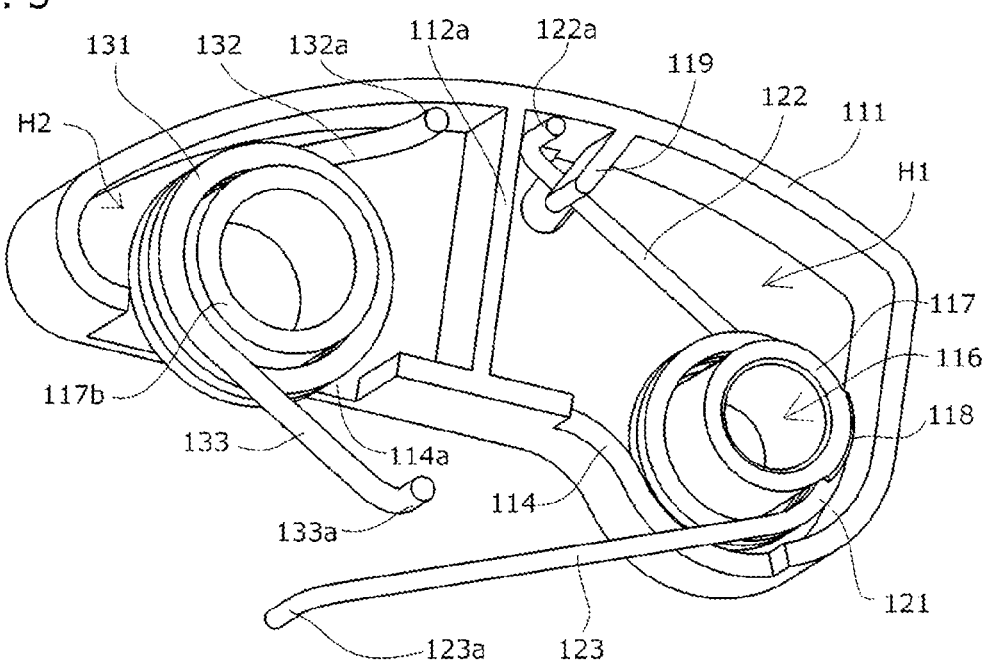
FIG. 3 is a perspective view on the back side illustrating the configuration of the tensioner lever.
Figure 4:
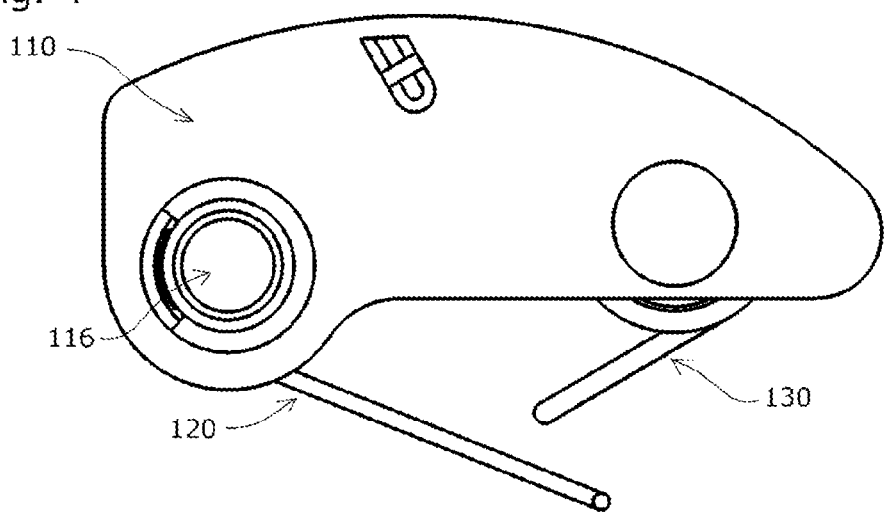
FIG. 4 is a side view on the front side illustrating the configuration of the tensioner lever.

The lever circumferential wall 111 includes, as also illustrated in FIG. 3, an arcuate circumferential wall part 111a having a shape conforming to the circumference of a concentric circle having the same center as the pivot shaft Pa, a substantially planar one end side circumferential wall part 111b continuous with one end of the arcuate circumferential wall part 111a and extending toward the chain CH, a chain-side circumferential wall part 111c with one end smoothly continuing from the other end of the one end side circumferential wall part 111b, and having a shape conforming to an arcuate convex toward the chain CH, a substantially planar non-chain-side circumferential wall part 111d with one end smoothly continuing from the other end of the arcuate circumferential wall part 111a, and extending on the opposite side of the chain-side circumferential wall part 111c, and an other end side circumferential wall part 111e in an arcuate shape smoothly continuing from the other ends of each of the chain-side circumferential wall part 111c and the non-chain-side circumferential wall part 111d. An outer surface of the chain-side circumferential wall part 111c facing the chain CH is configured as the shoe surface S that slidably guides the chain CH.

The space surrounded by the lever circumferential wall 111 is partitioned to two cavities in the longitudinal direction by a reinforcing rib part 112a provided between the chain-side circumferential wall part 111c and the non-chain-side circumferential wall part 111d. One cavity positioned on one side forms a first pressing spring accommodating part H1, and the other cavity positioned on the other side forms a second pressing spring accommodating part H2.

In a section of the lever circumferential wall 111 which defines the first pressing spring accommodating part H1 is a lever side wall part 115 that covers the first pressing spring accommodating part H1 formed continuously from an end face on the opposite side from the attachment surface.

The lever side wall part 115 is formed with a shaft hole 116 in which the pivot shaft Pa is inserted. A cylindrical boss part 117 is integrally formed to the lever side wall part 115 such as to protrude from the circumferential edge of the shaft hole 116 toward the attachment surface. With the pivot shaft Pa being inserted into the boss part 117, the lever body 110 is pivotably (rotatably) supported on the attachment surface.

The end face of the boss part 117 on the side facing the attachment surface protrudes slightly more toward the attachment surface than the lever circumferential wall 111, which prevents other parts than this end face of the boss part 117 on the side facing the attachment surface from contacting the attachment surface, so that smooth pivoting (rotation) of the lever body 110 around the pivot shaft Pa is ensured.

A restricting protrusion 118 is formed on an outer circumferential surface of the boss part at the end on the side facing the attachment surface to restrict the first pressing spring 120 from moving toward the attachment surface. This way, in a state before the tensioner lever 100 is attached to the attachment surface, the first pressing spring 120 is prevented from coming off of the lever body 110, and also, in a state where the tensioner lever 100 is attached to the attachment surface, the first pressing spring 120 is prevented from interfering with the attachment surface.

The first pressing spring 120 includes a first helical part 121, a first pressing arm 122 extending from one end of the first helical part 121, and a first support arm 123 extending from the other end of the first helical part 121. The first pressing arm 122 has a distal end portion 122a bent toward the attachment surface, while the first support arm 123 has a distal end portion 123a bent in the opposite direction from the attachment surface.

The first pressing spring 120 is set in the lever body 110 with the first helical part 121 loosely fitted around the outer circumferential surface of the boss part 117. The distal end portion 122a of the first pressing arm 122 forms a first loading point P1 by abutting against an inner surface of the chain-side circumferential wall part 111c, while the first support arm 123 extends out of the lever body 110 through a cut-out portion 114 provided to the arcuate circumferential wall part 111a, with the distal end portion 123a forming a first support point R1 by abutting against a first support part W1 provided to the attachment surface (see FIG. 1).

The distal end portion of the first pressing arm 122 is stopped by a spring lock rib 119 protruded from the inner surface of the chain-side circumferential wall part 111c, so that the distal end portion 122a of the first pressing arm 122 is kept in correct contact with the inner surface of the chain-side circumferential wall part 111c.

Accordingly, as illustrated in FIG. 1, in a state in which the tensioner lever 100 is attached to the attachment surface, the resilient force of the first pressing spring 120 exerts a torque on the lever body 110 around the pivot shaft Pa toward the chain CH so that the lever body presses the chain CH via the shoe surface S.

The tensioner lever 100 according to this embodiment includes a second pressing spring 130 supported on the lever body 110 at a different position from that of the first pressing spring 120. When the tensioner lever receives more than a predetermined load from the chain CH, the second pressing spring 130 generates a pressing force to exert a torque on the lever body 110 around the pivot shaft Pa toward the chain CH and to press the chain CH via the shoe surface S.

The second pressing spring 130 is set in the second pressing spring accommodating part H2, and includes a second helical part 131, a second pressing arm 132 extending from one end of the second helical part 131, and a second support arm 133 extending from the other end of the second helical part 131. The second pressing arm 132 has a distal end portion 132a bent toward the attachment surface, and the second support arm 133 has a distal end portion 133a that is bent also toward the attachment surface.

The second pressing spring 130 is set in the lever body 110 with the second helical part 131 loosely fitted around the outer circumferential surface of a second attachment part 117b. The distal end portion 132a of the second pressing arm 132 forms a second loading point P2 by abutting against an inner surface of the chain-side circumferential wall part 111c, while the second support arm 133 extends out of the lever body 110 through a second cut-out portion 114a provided to the non-chain-side circumferential wall part 111d, with the distal end portion 133a forming a second support point R2 by abutting against a second support part W2 provided to the attachment surface (see FIG. 1).

The first pressing spring 120 and second pressing spring 130 are both torsion coil springs and set such as to be compressed in opposite directions (their respective pressing arms and support arms extending from the helical parts in opposite directions).

While the first pressing spring 120 exerts a torque on the lever body 110 around the pivot shaft Pa toward the chain CH by resilient force so that the lever body presses the chain CH via the shoe surface S even when the chain CH is stopped, the second pressing spring 130 is not compressed when the chain CH is stopped, and disposed such as to generate an effective pressing force only when the lever body 110 receives more than a predetermined load from the chain CH and pivots more than a predetermined angle.

In this embodiment, the second pressing spring 130 has a larger spring constant than that of the first pressing spring 120. Therefore, the first pressing spring 120 having a smaller spring constant flexibly absorbs fluctuations in the chain tension within a normal range, and the second pressing spring 130 having a larger spring constant adds a pressing force in response to more than a predetermined load from the chain CH. Thus the maximum load can be increased.

When the tensioner lever is operating only with the first pressing spring 120 and the second pressing spring 130 is not exerting a pressing force, the second pressing spring may be not in contact with the second loading point P2 or the second support point R2. In such a case, the outside diameter or shape of the second attachment part 117*b*, the inner contour of the chain-side circumferential wall part 111*c*, or the shape of the second support part W2 may be optimized as required to allow the second pressing spring 130 to exert a pressing force without impact or damage.

While one embodiment of the present invention has been described in detail, the present invention is not limited to the embodiment described above and may be carried out with various design changes without departing from the scope of the present invention set forth in the claims.

For example, while the second pressing spring 130 has a larger spring constant than the first pressing spring 120 in the embodiment described above, both springs may have the same spring constant, or, contrarily, the first pressing spring 120 may have a larger spring constant.

The first pressing spring 120 may be configured to generate an effective pressing force when the lever body 110 receives more than a predetermined load from the chain CH and pivots more than a predetermined angle.

The first support part W1 and second support part W2 may be united by integrating the first pressing spring 120 and second pressing spring 130 such that the distal end portion 123*a* of the first support arm 123 is continuous with the distal end portion 133*a* of the second support arm 133.

What is claimed is:

1. A tensioner lever comprising: a lever body having a shoe surface that slidably guides a chain and rotatably supported on a pivot shaft standing on an attachment surface; and a pressing mechanism interposed between the lever body and the attachment surface to press the shoe surface toward the chain,
    the pressing mechanism including a first pressing spring and a second pressing spring,
    the first pressing spring including a first helical part loosely fitted to a cylindrical boss part provided to the lever body, a first pressing arm extending from one end of the first helical part and having a distal end portion contacting the lever body to form a first loading point, and a first support arm extending from the other end of the first helical part and having a distal end portion contacting and being supported by a first support part provided to the attachment surface to form a first support point,
    the second pressing spring being supported on the lever body at a different position from that of the first pressing spring.

2. The tensioner lever according to claim 1, wherein at least one of the first pressing spring and the second pressing spring is configured to generate an effective pressing force when the lever body receives more than a predetermined load from the chain and pivots more than a predetermined angle.

3. The tensioner lever according to claim 1, wherein the second pressing spring includes a second helical part loosely fitted to a cylindrical boss part provided to the lever body, a second pressing arm extending from one end of the second helical part and having a distal end portion contacting the lever body to form a second loading point, and a second support arm extending from the other end of the second helical part and having a distal end portion contacting and being supported by a second support part provided to the attachment surface to form a second support point.

4. The tensioner lever according to claim 3, wherein the first pressing spring and the second pressing spring are set such as to be compressed in opposite directions.

5. The tensioner lever according to claim 1, wherein the second pressing spring is disposed such as to generate an effective pressing force when the lever body receives more than a predetermined load from the chain and pivots more than a predetermined angle, and configured to have a larger spring constant than that of the first pressing spring.

* * * * *